UNITED STATES PATENT OFFICE.

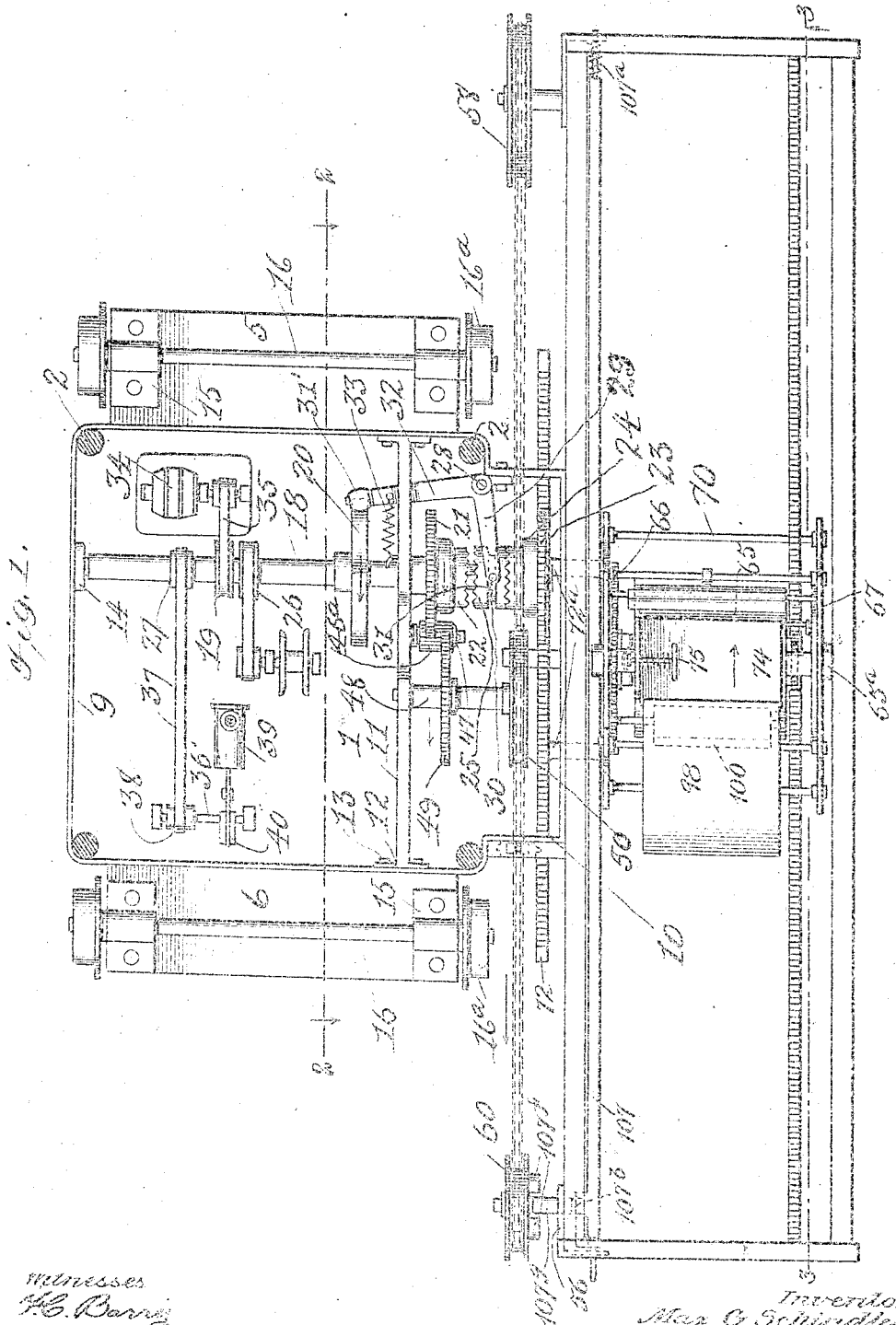

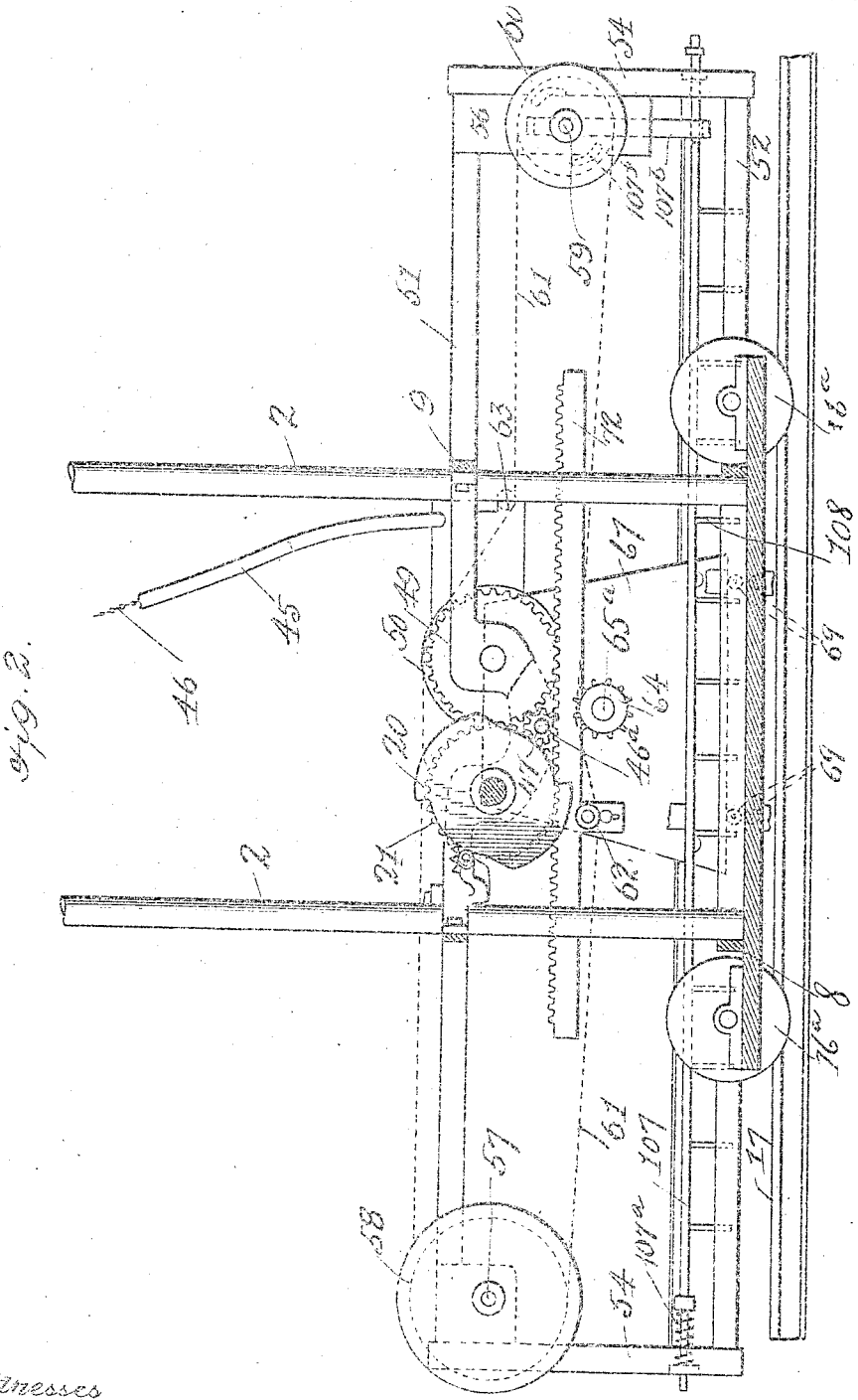

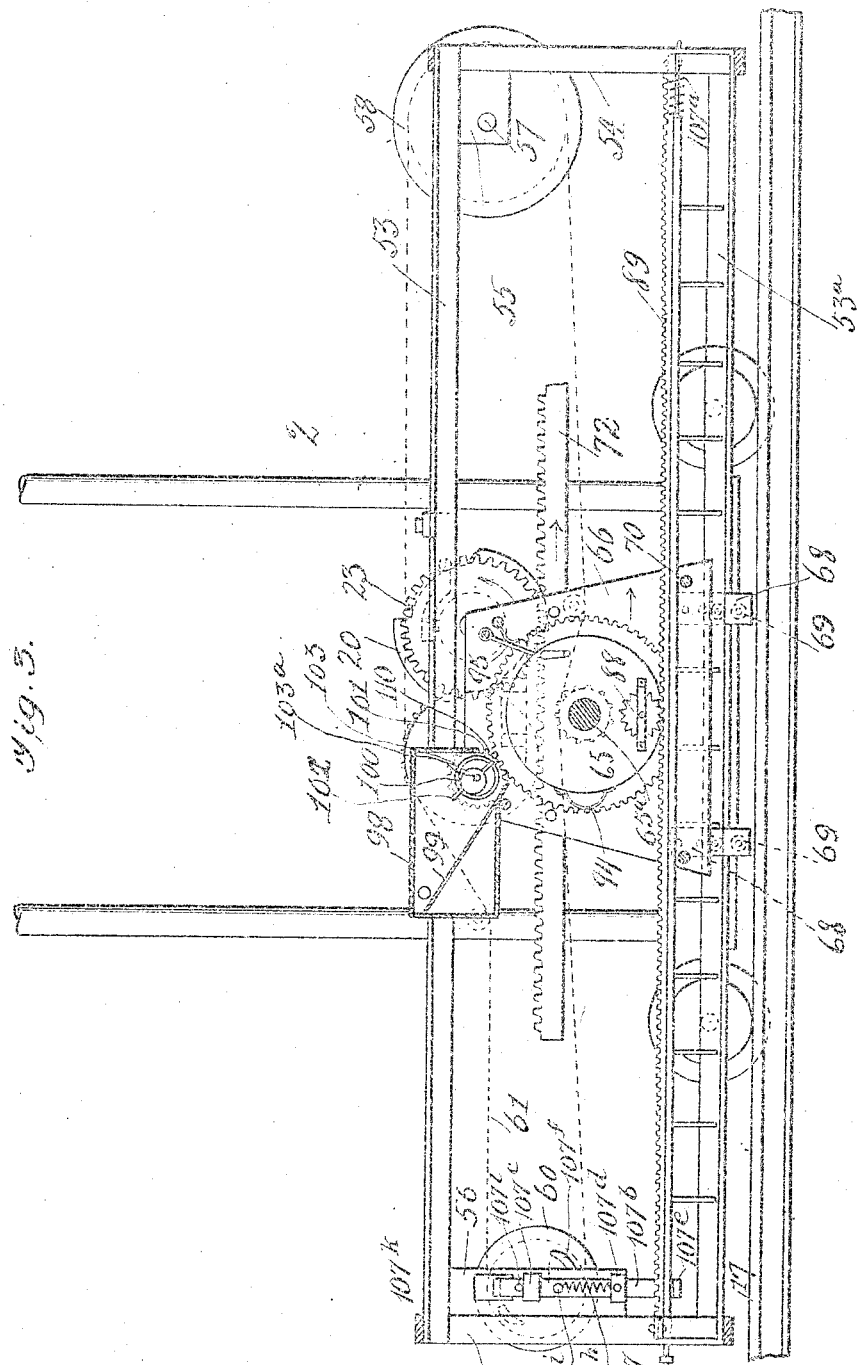

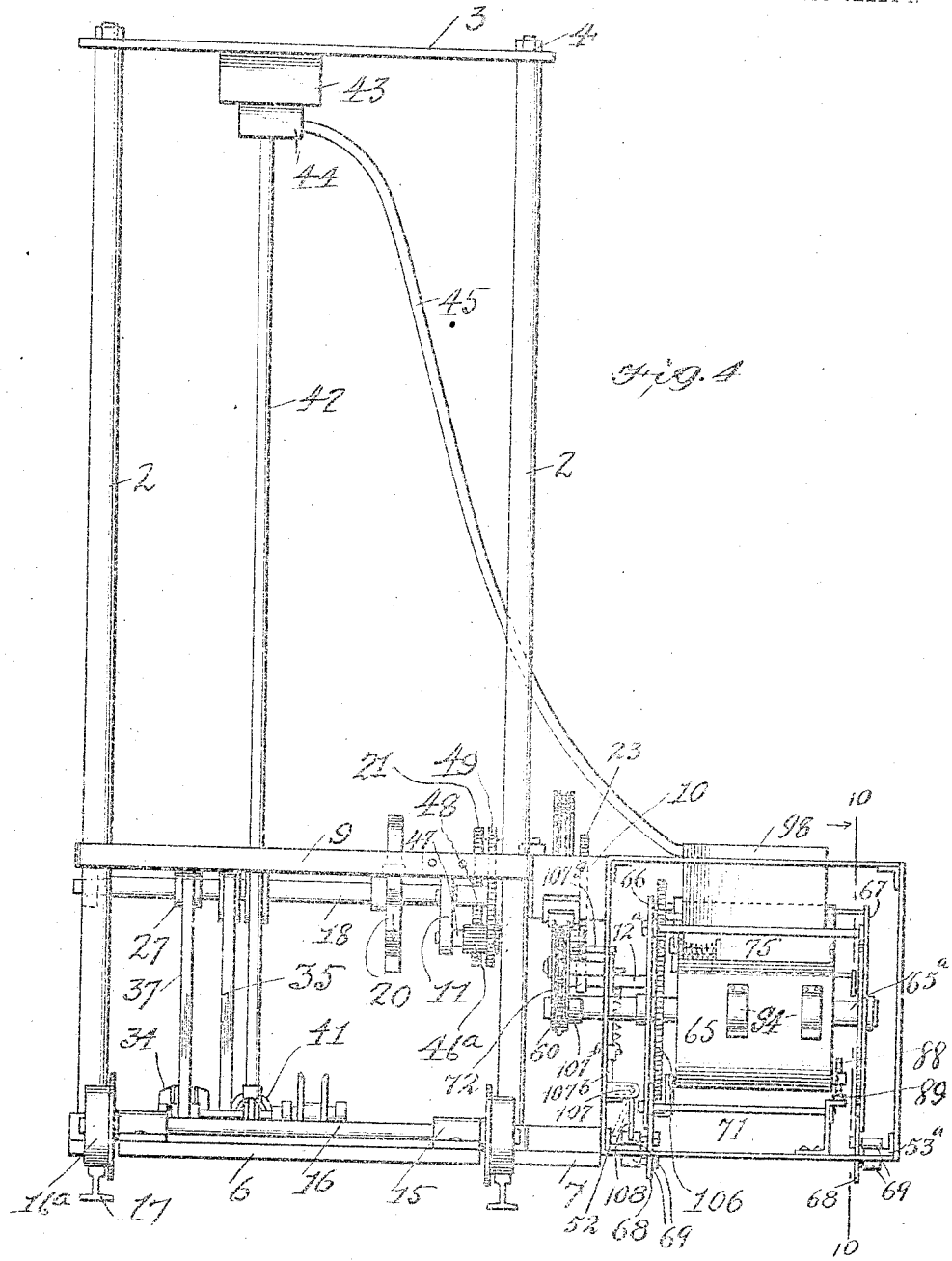

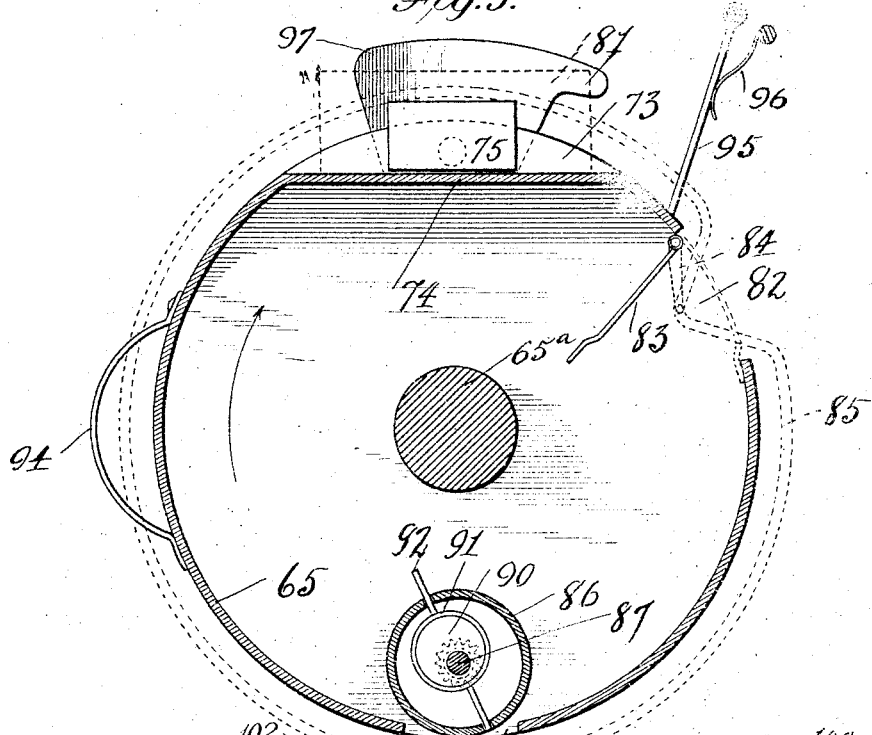

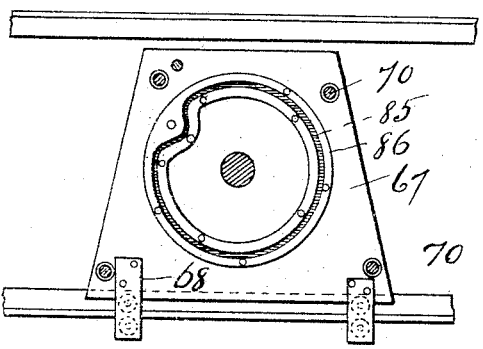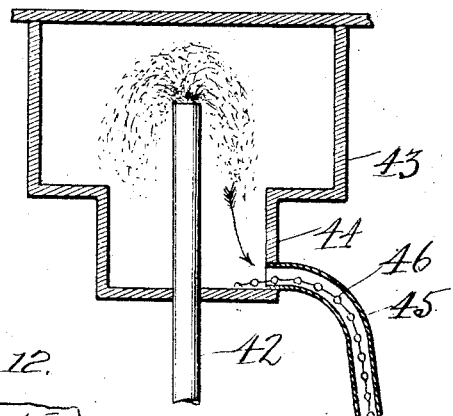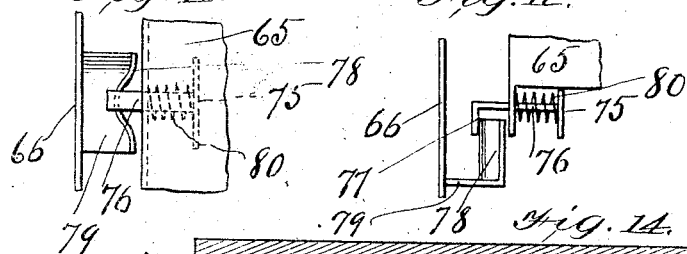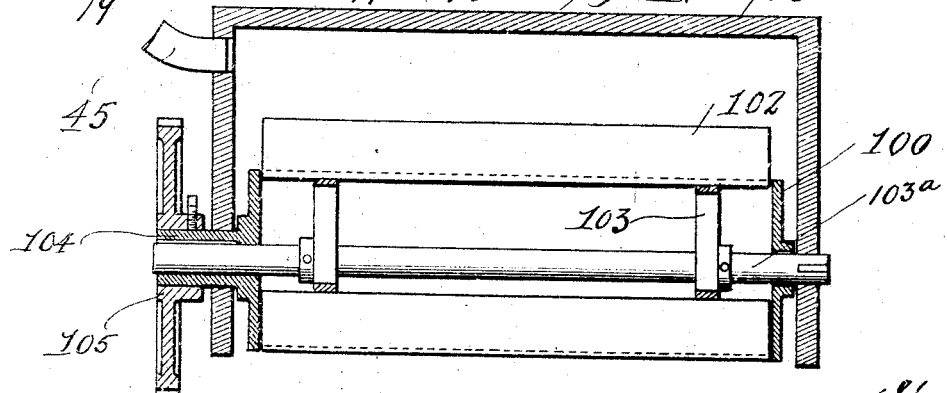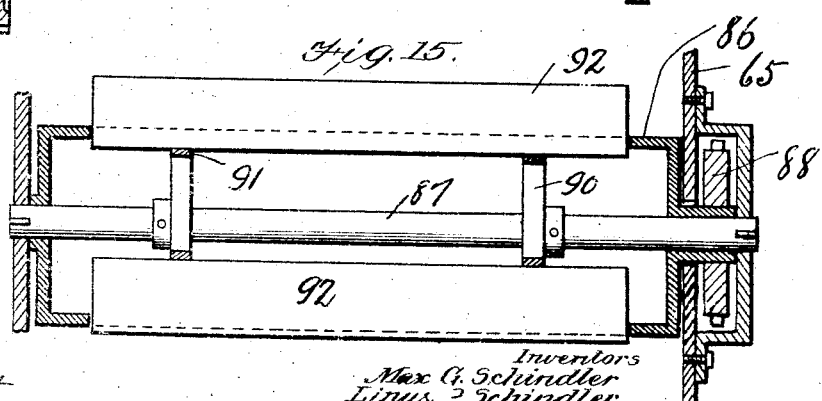

MAX GEORG SCHINDLER AND LINUS PAUL SCHINDLER, OF HAMBURG, GERMANY.

BRICKLAYING-MACHINE.

1,033,954.      Specification of Letters Patent.      Patented July 30, 1912.

Application filed December 28, 1909. Serial No. 535,273.

*To all whom it may concern:*

Be it known that we, MAX GEORG SCHINDLER and LINUS PAUL SCHINDLER, both citizens of the State of Hamburg and subjects of the German Emperor, residing at Böckmannstrasse 15, Hamburg, in the State of Hamburg, German Empire, have invented a new and useful Improvement in Bricklaying-Machines, of which the following is a specification.

This invention relates to bricklaying machines, and has for its object to provide a machine in a manner as hereinafter set forth for building up walls from superposed courses of brick with the interposition of mortar or cement between the bricks of a course and between the courses.

Further objects of the invention are to provide a brick laying machine which is comparatively simple in its construction and arrangement, strong, durable, efficient and convenient in its use, readily set up in operative position and comparatively inexpensive to manufacture.

With the foregoing and other objects in view, the invention consists in the novel construction combination and arrangement of parts as hereinafter more specifically described and illustrated in the accompanying drawings wherein is shown an embodiment of the invention, but it is to be understood that changes, variations, and modifications can be resorted to which come within the scope of the claims hereunto appended.

In describing the invention in detail, reference is had to the accompanying drawings wherein like reference characters denote corresponding parts throughout the several views and in which—

Figure 1 is a sectional plan view of a bricklaying machine in accordance with this invention. Fig. 2 is a section on line 2—2, Fig. 1 looking in the direction of the arrows. Fig. 3 is a section on line 3—3, Fig. 1 looking in the direction of the arrows. Fig. 4 is an end view of the machine. Fig. 5 is an enlarged cross sectional view of the operating cylinder constituting the brick carriers. Figs. 6 to 9 are diagrammatical views illustrating the manner in which the bricks and mortar are supplied in the laying of a course of bricks. Fig. 10 is a section on line 10—10, Fig. 4 looking in the direction of the arrows. Figs. 11 and 12 are details illustrating the means for holding brick on and releasing it from the operating cylinder. Fig. 13 is a sectional detail illustrating the mortar collector and the mortar supply and the mortar feed pipe. Fig. 14 is a sectional view of the feeding device for the mortar to the operating cylinder, and Fig. 15 is a sectional view of the mortar distributing device carried by the operating cylinder.

The machine consists essentially of a portable frame or support upon which is mounted a brick carrier generally in the form of a revoluble operating cylinder capable of being advanced as the bricks are laid and provided with means for gripping and releasing the bricks to be laid, with means for receiving and conveying the mortar for the joints, and with means for pressing the bricks in position; and associated with said operating cylinder is a mortar supply and mortar distributing device.

Referring to the drawings in detail, the portable frame of the machine consists of a base 1 and four corner uprights 2 connected together at the upper ends by brace members 3 from which is suspended in any suitable manner a mortar collector to be hereinafter referred to. The brace members 3 are secured in position by holdfast devices 4. The base 1 is formed with a pair of end extensions 5, 6, of less width than the base 1 and is further formed with a lateral extension 7 at its outer side. The extension 7 is of a length less than the length of the base. The corner uprights 2 are braced at their lower ends by a metallic strap 8 standing on edge and which is secured to the base and also to the uprights. Fixedly secured to the uprights 2 above the strap 8 is a continuous combined brace and supporting member 9, the latter surrounding the uprights and has the forward side thereof offset as at 10. The member 9 is braced by a longitudinally extending relatively wide bearing bar 11 which is flanged at each end as at 12 and with the flanged ends thereof secured to the inner faces of the ends of the member 9 as at 13. Fixedly secured to and depending from the rear side of the member 9 is a hanger 14. Mounted upon each of the extensions 5, 6 is a pair of bearings 15 in which is journaled an axle 16 projecting from each side of the extension and carrying flanged wheel 16$^a$ traveling upon the tracks 17 whereby the frame can be shifted in either direction.

Journaled in the hanger 14 and in the bar 11 as well as projecting forwardly of said bar 11 is the main operating shaft 18 of the machine provided with a drive pulley 19, a cam 20, a loose gear wheel 21 having one member 22 of a clutch, a loose gear wheel 23 having the other member 24 of the clutch, a duplex clutching sleeve 25 interposed between the members 22 and 24 and adapted to engage with either of said members for clutching its respective gear wheel to the shaft 18, and pulleys 26 and 27. The sleeve 25 is alternately operated in opposite directions to clutching position by a bell crank lever which is pivotally connected to the member 9 as at 28. One arm of the bell crank lever is indicated at 29 and is provided with a pin 30 which extends into the groove 31 of the sleeve 25 for shifting the latter upon the shaft 18 to clutch the gear wheel 21 to the shaft 18 when the bell crank is actuated in one direction by the cam 20 riding against a roller 31' carried by the other arm 32 of the bell crank. The construction of the cam 20 is such as to allow of the shifting of the bell crank lever in the opposite direction by a spring 33 attached at one end to the arm 32 and at its other end to the bar 11. When the bell crank lever is shifted by the spring 33 the sleeve 25 is moved to clutch the gear 23 to the shaft 18. When the shaft 18 is operated the cam 20 and spring 33 will oscillate the bell crank lever to cause an alternate clutching of the gears 21 and 23 to the shaft 18.

Upon the base 1 is mounted a prime mover, by way of example a motor 34 connected with the pulley 19 by a transmission belt 35. Arranged on the base 1 is a counter-shaft 36 operatively connected with the pulley 27 by a transmission belt 37 and pulley 38.

The reference character 39 denotes a mortar pump communicating with a source of supply (not shown) said pump operatively being connected as at 40 to the counter-shaft 36. Communicating with the outlet of the pump 41 is a vertically disposed mortar supply pipe 42 opening at its upper end into a mortar collector 43, having a reduced lower portion 44 with which communicates a flexible mortar feed pipe 45 having extending therethrough an endless chain 46 for the purpose of conveying the mortar through said feed pipe 45 to the mortar distributing device to be presently referred to. The pipe 45 opens into the mortar distributer as clearly shown in Fig. 10. The chain 46 is operated in any suitable manner.

Projecting forwardly from the bar 11 is a stub shaft 47 provided with a pinion 46ª which meshes with and is driven by the gear wheel 21. Journaled in and projecting forwardly from the bar 11 is a shaft 48 carrying a gear 49 which meshes with and is driven by the pinion 46ª. Mounted upon the outer end of the shaft 48 is a sprocket wheel 50 for a purpose to be presently referred to.

Secured to the offset portion 10 and to the strap 8 are the upper and lower inner longitudinal side bars 51, 52, of a carriage supporting frame. The lower bars 52 are also secured to and are of greater length than the base 1. The upper and lower outer side bars of the carriage supporting frame are indicated at 53, 53ª. The bars of the frame are angle shape in cross section. The ends of the carriage supporting frame are indicated at 54, are rectangular in cross section and are secured to the ends of the side bars 51, 52 and 53. Each end of the carriage supporting frame is provided with a bearing; these bearings are indicated at 55, 56. Projecting inwardly from and carried by the bearing 55 is a shaft 57 provided with a grooved pulley 58. Adjustably mounted in and projecting inwardly from the bearing 56 is a shaft 59 provided with a grooved pulley 60. The shaft 59 is arranged below the shaft 57. Traveling over the pulleys 58 and 60 is an endless chain 61 which is driven by the sprocket wheel 50. The chain 61 also travels over the idlers 62 and 63 and engages and rotates a sprocket pinion 64 fixed upon the shaft 65ª of the operating cylinder 65 which constitutes the brick carrier thereby revolving the latter.

Mounted within the carriage supporting frame is a traveling carriage 71 for supporting and shifting the cylinder 65. The carriage comprises a pair of uprights 66, 67, each having a pair of depending supports 68, each of which carries a pair of rollers 69 arranged in alinement but spaced from each other. The upper rollers 69 of the pairs of rollers travel upon the upper faces of the horizontal portions of the bars 52, 53ª, while the lower rollers 59 of the pairs of rollers travel against the lower faces of the horizontal portions of the bars 52, 53ª. The horizontal portions of the bars 52, 53ª constitute a track for the carriage of the operating cylinder 65. The uprights 66, 67 are connected by the tie bars 70.

The carriage 71 is shifted by the gear wheel 23 which engages with a longitudinally extending track 72 that is supported by arms 72ª extending outwardly from the upright 66 and below the offset 10. When the clutch sleeve 25 couples the gear 23 to the shaft 18, the carriage 71 is moved longitudinally of its supporting frame. The movement of the carriage 71 is an intermittent one due to the action of the cam 20 and spring 33 alternately shifting the bell crank to alternately move the clutch sleeve 25 in opposite directions. In this connection it will be stated that during one portion of the revolution of the shaft 18 the gear 23 is coupled to the shaft 18 and during another portion of the revolution of the shaft 18

18 the wheel 21 is coupled to the shaft 18; the effect of this is, that at one moment the chain 61 is set in motion by means of the sprocket wheel 50, and operates the pinion 64, thereby revolving the cylinder 65, while at another moment the wheel 23 engages with the rack 72 and advances the carriage 71.

The cylinder 65 constituting the brick carrier is provided in its periphery with a pocket 73 having a flat bottom 74. The pocket 73 is for the reception of the bricks which when the cylinder 65 revolves are transported to the course that is being laid. The bricks are held against one of the side walls of the pocket by a spring controlled retainer plate 75, carried by a bar 76, which projects through one end of the cylinder and is provided at its outer end with a hook 77 adapted to be engaged by the curved retractor 78, supported by an arm 79 projecting inwardly from the upright 66. Interposed between one wall of the pocket 73 and the plate 75 and surrounding the bar 76 is a coiled spring 80, the function of which is to maintain the plate 75 against the brick 81 whereby the latter is held in the pocket 73, while the cylinder 65 revolves and until the hook 77 rides against the curved retractor 78, which causes the bar 76 to move outwardly thereby carrying the plate 75 therewith and releasing the brick 81. After the hook 77 passes clear of the retractor 78 the spring 80 returns the plate 75 to normal position. The releasing of the brick 81 takes place when the cylinder has carried the brick to its position in the course being laid.

The brick carrier or cylinder 65 is provided with a mortar or cement inlet opening 82 which is closed by a flap valve 83, the latter being shifted to open position at predetermined periods for a supply of mortar or cement to the cylinder 65. The valve 83 is provided with an arm 84 which travels in a cam groove 85 formed in an annulus 86 fixed to the inner face of the upright 67.

Opposite the pocket 73 and within the cylinder 65 in proximity to the wall thereof is arranged a drum 86 carried by a spindle 87 which is journaled in and projects from the heads of the cylinder 65. Carried by one of the projecting ends of the spindle 87 is a pinion 88 which rolls upon a longitudinal rack 89 supported within the carriage frame, so that as the carriage 71 is shifted the spindle 87 will be revolved carrying the drum 86 therewith. The spindle 87 is provided with eccentrics 90, on which are loosely mounted rings 91. Knives 92 are attached to the rings 91 at diametrically opposite points, and project through slits in the drum 86. The periphery of the drum 86 is approximately in line at its lower side with the periphery of the cylinder 65, the latter being formed with an aperture 92ᵃ through which the contents of the cylinder 65 are discharged. On that side of the periphery of the cylinder 65 opposite the flap valve 83 are arranged bow-shaped springs 94, which are adapted to move the last laid brick into the same level as the preceding bricks.

A scraper 95 touches the upper side of the cylinder 65 and is pressed against the surface of the cylinder by means of a spring 96 fixed on the carriage 71. On one side of the cylinder 65 is arranged a striker 97, which comes in contact with a part of the scraper 95 on rotation of the cylinder 65, so that the said scraper is pushed aside at a determined moment. This striker 97 is preferably made adjustable.

Above the cylinder 65 and supported by the carriage 71 is arranged a mortar or cement distributing device, consisting essentially of a rectangular vessel 98 with a partially inclined bottom 99, and a distributing drum 100 arranged above the outlet 101. The distributing drum 100 is provided in a similar manner to the drum 86 with double knives 102 mounted on eccentric rings 103, the said knives 102 being arranged to project from the drum 100 in determined positions and to carry with them a certain quantity of material, which they discharge from the interior of the vessel 98. The drum 100 is mounted upon a spindle 103ᵃ which is journaled at one end in one end of the vessel 98. The other end of the spindle 103ᵃ extends into a journal 104 which projects from one end of the drum 100 and is journaled in and projects from the other end of the vessel 98. The journal 104 carries a gear wheel 105 which when the cylinder 65 is revolved engages with and is revolved by a gear 106 carried by the shaft 65ᵃ.

The supply of material to the distributing device takes place through the pipe 45 opening into the upper portion of the vessel 98.

For holding the carriage in the position to which it has been moved to correspond to the spacing of the bricks, so that the carriage may not shift on its track when the propelling means for the carriage is thrown out of gear, and the revolving means for the brick carrier or cylinder thrown into gear, means is provided to project into the path of travel of the guide wheels 69 and there remain during the time that the brick carrier is being revolved and placing its brick on the course. Different constructions of device have been employed by us in practice for this holding of the carriage, that herein shown embodying a rake-like device consisting of a spring-controlled bar 107 rotatably mounted at its ends in the frame of the carriage, and having depending stop arms 108. This bar 107 which is rockable is under the stress of a spring 107ᵃ (see Figs. 1 and 3) which acts on the bar to cause the arms 108 thereof to lie in the path of the guide wheels 69 as shown by full line position of said stop arms in Fig. 4 of the drawings. In this position of the stop arms, the carriage is held against shifting on its track while the cylinder or brick carrier is rotating and the brick is being laid. The stop arms are swung to one side of the path of travel of the guide wheels 69 simultaneously with the shifting of the clutch to step the carriage forward so as to lie in the position shown by dotted lines in Fig. 4, by means of a lift $107^b$ (see Fig. 3) which is mounted for vertical movement in keepers $107^c$, $107^d$ carried by the bearing 56. The foot $107^e$ on the lower end of this lift turns the bar 107 as the lift is raised. For raising the lift, one or more cams $107^f$ are provided on the inner face of the wheel 60 for engagement with the outwardly-extending upper end $107^g$ on the lift. A spring $107^h$ has one end connected to the keeper $107^d$ and its other end to a pin $107^i$ carried by the lift to effect quick return of the lift and permit spring $107^a$ to return bar 107. The lug or outwardly-extending end $107^g$ moves in a slot $107^k$ provided therefor and is supported in its normal position by a pin $107^l$ resting on keeper $107^c$ while its upward movement is limited by the pin $107^l$.

The operation of the apparatus is as follows: A layer of mortar having been placed upon the periphery of the cylinder 65 in front of the pocket 73 by means of the distributing device, a brick 81 is placed between the plate 75 and one side wall of the pocket 71, either by hand or by means of a suitable conveying apparatus, this being quickly and easily performed during the rotation and the forward movement of the cylinder 65. Upon further rotation of the cylinder 65, a portion of the layer of mortar placed thereon is first caused to slide by means of the scraper 95 into the interior of the cylinder 65 through the flap 83, which is open during the movement, whereupon the flap 83 is again closed by means of the cam groove 85 and the arm 84, and the scraper 95 commences to slide the remainder of the layer of mortar against one side of the brick 81 (Fig. 6). Upon further motion of the cylinder 65 the layer of mortar in front of the scraper 95 is pressed against one side of the brick 81, whereupon the scraper is forced aside by means of the striker 97, so as to free the path for the brick 81 (Fig. 7). Upon further rotation of the cylinder 65, the brick 81 reaches a downward position and is liberated in this position by the plate 75 being drawn back by the hook 77 and retractor 78, so that it falls next to the last laid portion of the course, upon a layer of mortar already laid down (Fig. 8). Upon further rotation of the cylinder 65, the springs 94 come in contact with the brick 81 just laid and press the latter down to its correct level and against the bricks previously laid (Fig. 9). The mortar squeezed out thereby may, if desired, be caught by a special scraping device (not illustrated). At this moment fresh mortar is supplied to the cylinder 65 by means of the distributing device, the drum 100 being set in rotation by the driving gear, and a certain quantity of mortar being discharged from the outlet 101 by means of the knives 102. The stream of mortar is cut off by means of a fixed wire 110. This stream of mortar passing out of the distributing device reaches the cylinder 65 in such a manner that a part of the stream falls in the direction of motion, against the flap 83 and partly behind the latter. When this movement of the cylinder 65 takes place, the rods 108 of the stopping device are maintained in their lowered position, so that they stop the guide wheels of the carriage 71. At the same time that part of the cam 20 having the larger diameter comes in contact with the bell-crank lever, so that the wheel 21 is coupled with the shaft 18 and sets the chain 61 in motion through the medium of the sprocket wheel 50, the motion being transmitted to the shaft $65^a$ of the cylinder 65 by means of the sprocket pinion 64. After the springs 94 have come in contact with the freshly laid bricks, that part of the disk 20 having the smaller diameter comes in contact with the bell-crank lever, so that the wheel 21 is disengaged and the wheel 23 is coupled with the shaft 18. By means of the stopping device, the stop arms 108 are at the same time removed from the path of the guide wheels of the carriage, so that by the action of the wheel 23 on the rack 72 the carriage is now advanced through a distance equal to the exact spacing of the bricks, owing to the stopping device immediately falling back. As soon as this advance is completed, that part of the disk 20 having the larger diameter again comes in contact with the bell-crank lever, so that the wheel 21 again engages with the shaft 18 for the purpose of rotating the cylinder 65 and performing another bricklaying operation. During the advance of the carriage, the pinion 88 of the small cylinder 86 mounted inside the cylinder 65, engages with the rack 89, turns the cylinder 65 and causes the knives 92 projecting out of the cylinder 86 to discharge a determined quantity of mortar from the aperture $92^a$. Corresponding to the advance of the carriage, the stream of mortar, which is cut off by means of wire 112 stretched across the trolley frame underneath the cylinder 86 is laid down next to the last laid brick and upon the course of bricks below. The clutch is now again changed over, as before described, and rotation of the carriage thereupon again takes place for the purpose of laying a fresh brick.

What we claim is:—

1. A bricklaying machine comprising a rotatable brick carrier, means for automatically gripping the brick upon the carrier during a part of the revolution of said carrier, and means for releasing the brick when the carrier has conveyed the brick to a position to be laid.

2. A bricklaying machine comprising a rotatable brick carrier, means for automatically gripping the brick upon the carrier during a part of the revolution of said carrier, means for releasing the brick when the carrier has conveyed the brick to a position to be laid, and means connected to the carrier for pressing the brick in position.

3. A bricklaying machine comprising a rotatable brick carrier, means for automatically gripping the brick upon the carrier during a part of the revolution of said carrier, means for releasing the brick when the carrier has conveyed the brick to a position to be laid, and means for intermittently shifting the carrier in a longitudinal direction after the brick has been placed in position and pressed.

4. A bricklaying machine comprising a rotatable brick carrier, means for automatically gripping the brick upon the carrier during a part of the revolution of said carrier, means for releasing the brick when the carrier has conveyed the brick to a position to be laid, means connected to the carrier for pressing the brick in position, and means for intermittently shifting the carrier in a longitudinal direction after the brick has been placed in position and pressed.

5. A bricklaying machine comprising a rotatable brick carrier, means for automatically gripping the brick upon the carrier during a part of the revolution of said carrier, means for releasing the brick when the carrier has conveyed the brick to a position to be laid, and a mortar distributing means associated with said carrier.

6. A bricklaying machine comprising a rotatable brick carrier, means for automatically gripping the brick upon the carrier during a part of the revolution of said carrier, means for releasing the brick when the carrier has conveyed the brick to a position to be laid, means connected to the carrier for pressing the brick in position, and a mortar distributing means associated with said carrier.

7. A bricklaying machine comprising a rotatable brick carrier, means for automatically gripping the brick upon the carrier during a part of the revolution of said carrier, means for releasing the brick when the carrier has conveyed the brick to a position to be laid, means for intermittently shifting the carrier in a longitudinal direction after the brick has been placed in position and pressed, and a mortar distributing means associated with said carrier.

8. A bricklaying machine comprising a rotatable brick carrier, means for automatically gripping the brick upon the carrier during a part of the revolution of said carrier, means for releasing the brick when the carrier has conveyed the brick to a position to be laid, means connected to the carrier for pressing the brick in position, means for intermittently shifting the carrier in a longitudinal direction after the brick has been placed in position and pressed, and a mortar distributing means associated with said carrier.

9. A bricklaying machine comprising a rotatable brick carrier, means for automatically gripping the brick upon the carrier during a part of the revolution of said carrier, means for releasing the brick when the carrier has conveyed the brick to a position to be laid, means for intermittently shifting the carrier in a longitudinal direction after the brick has been placed in position, and means for revolving the carrier after each longitudinal shift thereof.

10. A bricklaying machine comprising a rotatable brick carrier, means for automatically gripping the brick upon the carrier during a part of the revolution of said carrier, means for releasing the brick when the carrier has conveyed the brick to a position to be laid, means connected to the carrier for pressing the brick in position, means for intermittently shifting the carrier longitudinally after the brick has been pressed in position, and means for revolving the carrier after each longitudinal shift thereof.

11. A bricklaying machine comprising a rotatable brick carrier, means for automatically gripping the brick upon the carrier during a part of the revolution of said carrier, means for releasing the brick when the carrier has conveyed the brick to a position to be laid, means for intermittently shifting the carrier in a longitudinal direction after the brick has been placed in position and pressed, and means for revolving the carrier after each longitudinal shift thereof.

12. A bricklaying machine comprising a rotatable brick carrier, means for automatically gripping the brick upon the carrier during a part of the revolution of said carrier, means for releasing the brick when the carrier has conveyed the brick to a position to be laid, means connected to the carrier for pressing the brick in position, means for intermittently shifting the carrier in a longitudinal direction after the brick has been placed in position and pressed, and means for revolving the carrier after each longitudinal shift thereof.

13. A bricklaying machine comprising a rotatable brick carrier, means for automatically gripping the brick upon the carrier during a part of the revolution of said carrier, means for automatically releasing the brick when the carrier has conveyed the brick to a position to be laid, means for intermittently shifting the carrier in a longitudinal direction after the brick has been placed in position, a mortar distributing means associated with said carrier, and means for revolving the carrier after each longitudinal shift thereof.

14. A bricklaying machine comprising a rotatable brick carrier, means for automatically gripping the brick upon the carrier during a part of the revolution of said carrier, means for releasing the brick when the carrier has conveyed the brick to a position to be laid, means connected to the carrier for pressing the brick in position, means for intermittently shifting the carrier in a longitudinal direction after the brick has been placed in position and pressed, a mortar distributing means associated with said carrier, and means for revolving the carrier after each longitudinal shift thereof.

15. A bricklaying machine comprising a rotatable brick carrier, means for automatically gripping the brick upon the carrier during a part of the revolution of said carrier, means for releasing the brick when the carrier has conveyed the brick to a position to be laid, means for intermittently shifting the carrier in a longitudinal direction after the brick has been placed in position and pressed, a mortar distributing means associated with said carrier, and means for revolving the carrier after each longitudinal shift thereof.

16. A bricklaying machine comprising a rotatable brick carrier, means for automatically gripping the brick upon the carrier during a part of the revolution of said carrier, means for releasing the brick when the carrier has conveyed the brick to a position to be laid, means connected to the carrier for pressing the brick in position, means for intermittently shifting the carrier in a longitudinal direction after the brick has been placed in position and pressed, a mortar distributing means associated with said carrier, and means for revolving the carrier after each longitudinal shift thereof.

In testimony whereof we affix our signatures.

MAX GEORG SCHINDLER.
LINUS PAUL SCHINDLER.

In the presence of—.
ERNEST H. L. MUMMENHOFF,
IDA CHR. HAFERMANN.